United States Patent
Saika et al.

(10) Patent No.: US 7,181,477 B2
(45) Date of Patent: Feb. 20, 2007

(54) STORAGE SYSTEM AND STORAGE CONTROL METHOD

(75) Inventors: Nobuyuki Saika, Yokosuka (JP); Takashi Horiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 10/868,991

(22) Filed: Jun. 15, 2004

(65) Prior Publication Data

US 2005/0198083 A1 Sep. 8, 2005

(30) Foreign Application Priority Data

Mar. 2, 2004 (JP) ............................. 2004-057813

(51) Int. Cl.
*G06F 17/30* (2006.01)
(52) U.S. Cl. ...................... 707/203; 707/200
(58) Field of Classification Search ................ 707/200, 707/203, 204, 8; 711/100, 114; 714/6, 100
See application file for complete search history.

(56) References Cited

U.S. PATENT DOCUMENTS

| 6,446,176 | B1 | | 9/2002 | West et al. | |
|---|---|---|---|---|---|
| 6,651,075 | B1 | * | 11/2003 | Kusters et al. | 707/204 |
| 6,912,632 | B2 | * | 6/2005 | Mori | 711/162 |
| 2003/0131278 | A1 | | 7/2003 | Fujibayashi | |
| 2003/0177306 | A1 | | 9/2003 | Cochrane et al. | |
| 2004/0133602 | A1 | * | 7/2004 | Kusters et al. | 707/104.1 |
| 2005/0228957 | A1 | * | 10/2005 | Satoyama et al. | 711/162 |
| 2006/0020640 | A1 | * | 1/2006 | Suzuki et al. | 707/201 |

FOREIGN PATENT DOCUMENTS

JP 2002-373093 12/2002

\* cited by examiner

*Primary Examiner*—Don Wong
*Assistant Examiner*—Marc Filipczyk
(74) *Attorney, Agent, or Firm*—Townsend and Townsend and Crew LLP

(57) ABSTRACT

A primary volume group 30 includes a primary volume 31 and a differential volume 32. A secondary volume group 40 includes a primary volume 41 and a differential volume 42. Multiple generations of differential snapshots D1 to D3 are accumulated in the differential volume 32. When a new snapshot obtaining request is issued while a usage rate has reached a given value, the volume groups 30 and 40 are synchronized with the volume snapshot (a), and then split (b). After being split, the differential volume 32 is initialized, and the secondary volume group 40 is backed up (c). Accordingly, a new differential snapshot can be created and held in the differential volume 32.

10 Claims, 9 Drawing Sheets

STORAGE SYSTEM AND STORAGE CONTROL METHOD

CROSS-REFERENCE TO RELATED APPLICATIONS

This application relates to and claims priority from Japanese Patent Application No. 2004-57813 filed on Mar. 2, 2004, the entire disclosure of which is incorporated herein by reference.

BACKGROUND OF THE INVENTION

1. Field of the Invention

The present invention relates to a storage system and a storage system control method.

2. Description of the Related Art

In a storage system, a large-capacity storage device can be used to provide storage service to many host computers. An example of a large-volume storage device, there is known a disk array device in which a plurality of disk drives arranged in an array pattern are operated based on a RAID (Redundant Array of Inexpensive Disks).

The storage system provides a snapshot creation function, in order to achieve a high availability and the like. A "snapshot" is a still image of data at the time when the snapshot is created. Snapshots can be divided into volume snapshots and differential snapshots.

A "volume snapshot" is a technique in which the same data is held in both a primary volume and a secondary volume, and the data is duplicated ("mirroring") to obtain the snapshot (Japanese Patent Application Laid-open No. 2002-373093, Official Gazette). When the snapshot is to be obtained, a link between the primary volume and the secondary volume is terminated (split), and the secondary volume which has been separated from the primary volume is used as the snapshot. The secondary volume is a copy of the primary volume at the time when the snapshot was created. By using the secondary volume to make a backup, the primary volume can be used to provide the storage service even while backup processing is being performed. Once the backup is complete, the data that was updated in the primary volume while the volumes were split is then reflected in the secondary volume, and then the duplication starts again.

The "differential snapshot" refers to a technique in which information about altered locations on the primary volume are managed to achieve the snapshot of a given point in time. For example, when updating the data stored in the primary volume, the pre-update data (old data) is evacuated into the differential volume, and new data is written into the primary volume. Then, a table or the like is used to manage management information relating to the location where the data was updated, the destination to which the data was evacuated, and the like. Accordingly, data constructions at specific points in time can be managed over multiple generations (multiple points in time).

The volume snapshot copies the entire volume at a certain point in time. By using the volume snapshot created at a time desired by the user, the data group from that point in time can be used immediately. Furthermore, since the volume snapshot copies the entire volume, the volume snapshot is very reliable when disk damage and the like occur. However, the volume snapshot requires the same amount of volume as the volume where the data was copied from. Therefore, the greater the number of volumes and number of generations in the snapshot, the more volume becomes necessary. Since a large amount of volume becomes necessary, the snapshot can be taken across relatively few generations.

On the other hand, the differential snapshot separately extracts and manages only the information pertaining to the location that was updated, which can reduce the volume capacity that is needed to create the snapshot, as compared to the volume snapshot. Furthermore, since the differential snapshot extracts and manages the information pertaining to the location where the alteration occurred, the snapshot can be obtained faster than when using the volume snapshot. However, with the differential snapshot, for example, when double disk damage occurs and the differential data is lost, the snapshot is also lost at that point in time. Therefore, the differential snapshot is less reliable when disk damage occurs, as compared to the volume snapshot. Here, "double disk damage" refers to the simultaneous occurrence of multiple damage in the group of disks constituting the RAID group. Furthermore, since the capacity of the differential volume is set relatively small, there is a chance that the differential snapshot will be created in excess of the capacity of the differential volume. When this occurs, a previous differential snapshot is overwritten by the new differential snapshot, whereby the previously obtained differential snapshot is lost.

SUMMARY OF THE INVENTION

It is therefore an object of this invention to provide a storage system and a storage system control method, which use fewer storage resources, and achieves generational management of data with high reliability. It is another object of this invention to provide a storage system and a storage system control method which can manage more generations of data. Other objects of the present invention should become clear from the descriptions of the embodiments below.

According to an embodiment of the present invention, a storage system includes a first volume, a first alteration status management volume which stores information indicating an alteration status of the first volume, a second volume associated with the first volume, a second alteration status management volume associated with the first alteration status management volume, and a volume synchronization unit that shift between split processing and synchronization processing when the usage rate of the first alteration status management volume has reached a predetermined value.

According to another embodiment of the present invention, a storage system control method includes synchronizing and using content stored in a first volume group and content stored in a second volume group. A usage rate of a differential volume which store information indicative of altered portions in the first volume is obtained. Synchronization of the first volume group and the second volume group ceases when the usage rate has reached a pre-set given value.

DETAILED DESCRIPTION OF THE PREFERRED EMBODIMENTS

Figure 1:
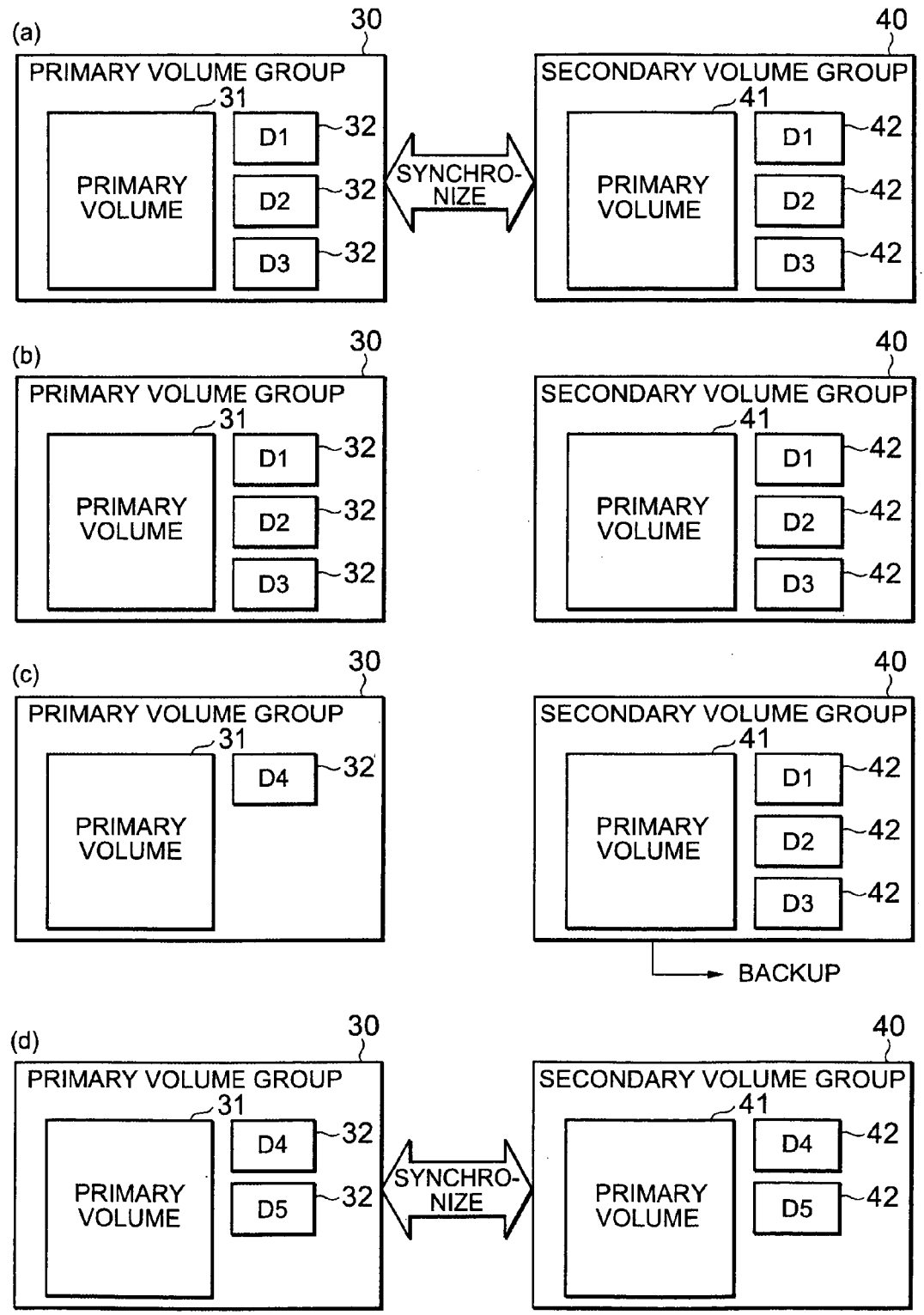
FIGS. 1A through 1D are schematic diagrams showing an outline of a storage system according to the present invention.

In order to resolve the above-mentioned problems, a storage system according to the present invention is provided with: a first volume that stores data updated or referenced by a host device; a first alteration status management volume that stores information showing alteration status of the first volume; a second volume associated with the first volume; a second alteration status management volume associated with the first alteration status management volume; and a volume synchronization unit that performs synchronization processing to synchronize stored content in the first volume and second volume, and in the first alteration status management volume and second alteration status management volume, respectively.

The "alteration status of the volume" refers to the alteration status of data stored in the volume, for example. In the first and the second alteration status management volumes, for example, it is possible to store information about pre-update data, the data's original storage address, and the like. The volume synchronization unit synchronizes the stored content in the first and second volumes, and synchronizes the stored content in the first and second alteration status management volumes. Synchronizing the first and second volumes enables the still data image from a given point in time to be obtained for the whole volume. Furthermore, the first alteration status management volume can be used to manage just those portions of the first volume where alterations have occurred. Then, by synchronizing the first alteration status management volume and second alteration status management volume, the information about the alteration status can be duplicated to increase reliability.

It is also possible to provide a control unit which, when the usage status of the first alteration status management volume reaches a pre-set status, makes the volume synchronization unit perform the synchronization processing, and initializes the first alteration status management volume.

Then, for example, the "usage status" of the first alteration status management volume can be a usage rate of the first alteration status management volume as a pre-set status, with a pre-set given value. Instead of the usage rate, it is also possible to use other parameters such as usage capacity, or the like.

The first volume and first alteration status management volume, and the second volume and second alteration status management volume, are referred to as "the first and second volumes, etc.". As methods for operating the first and second volumes, one can consider synchronized operation in which the volumes are always synchronized, and split operation in which the volumes are always split. When the usage status of the first alteration status management volume reaches the given status (when given timing is reached), if the first and second volumes, etc. are being operated in split operations, then the first volume and second volume are synchronize with each other, and the first alteration status management volume and second alteration status management volume are synchronized with each other. On the other hand, if the first and second volume, etc. are being operated as synchronized operations, then the synchronization processing is complete at that point in time, so it is not necessary to execute the synchronization processing.

The control unit synchronizes the first and second volumes, etc., and then initialize the first alteration status management volume. Thus, information pertaining to new alterations in the first volume can be stored into the first alteration status management volume. The information that was being stored in the first alteration status management volume before initialization, is stored in the second alteration status management volume. In this way, when the usage status of the first alteration status management volume reaches the pre-set status, the stored content in the first alteration status management volume is moved to the second alteration status management volume, and then the first alteration status management volume is initialized and the new information is stored. Furthermore, at substantially simultaneous timing, the stored content in the first volume can be moved to the second volume. Therefore, when the given timing is reached, it is possible to obtain both a copy of the entire volume at that time, and a copy of information relating to the alterations up to that point in time. Moreover, the first alteration status management volume can be initialized and reused to manage more generations of data based on the alteration status of the stored content.

For example, assuming synchronized operations, the control unit under normal circumstances makes the volume synchronization unit perform the synchronization processing, and when the usage status of the first alteration status management volume reaches the pre-set state, the control unit makes the volume synchronization unit stop the synchronization processing and initializes the first alteration status management volume.

When the synchronization processing is complete, the control unit can makes a backup storage unit backup the stored content in the second volume and the second alteration status management volume. More specifically, after synchronizing the first and second volumes, etc., the first and second volumes, etc. are then be split and the stored content in the second volume and the second alteration status management volume is backed by the backup storage unit. Accordingly, the backup storage unit can backup both the stored content from before the first alteration status management volume is initialized, and the stored content in the first volume at the given timing. Furthermore, since this backup is performed to backup the second volume and the second alteration status management volume, the usage of the first volume and the first alteration status management volume is not interrupted.

The volume synchronization unit inputs the updated data from the host device into both the first volume and the second volume, whereby executing the synchronization processing.

A storage system control method according to another aspect of the present invention is a control method for a storage system having: a first volume group including a first volume and a first differential volume that stores information showing altered portions in the first volume; and a second volume group including a second volume associated with the first volume, and a second differential volume associated with the first differential volume, the method including the steps of: synchronizing and using the stored content of the first volume group and stored content of the second volume group; obtaining a usage rate of the first differential volume; stopping the synchronization of the first volume group and the second volume group when a usage rate reaches a pre-set given value; and initializing the first differential volume.

Furthermore, after the step of stopping the synchronization of the first volume group and the second volume group, the method may also include a step of backing up the stored content of the second volume group.

A storage system according to yet another aspect of the present invention is provided with: a first volume group including a first volume and a first differential volume that stores information showing altered portions in the first volume; a second volume group including a second volume associated with the first volume, and a second differential volume associated with the first differential volume; a volume synchronization unit that synchronizes the stored content in the first volume group and the stored content in the second volume group; and a control unit that, under given circumstances, makes the stored content in the first differential volume and the stored content in the second differential volume become different from each other.

Below, based on FIG. 1 through FIG. 8, explanation is given regarding embodiments of the present invention. A storage system 100 of the present invention, which is explained in detail below, is provided with a primary volume group 30 and a secondary volume group 40. The primary volume group 30 is constructed including a first primary volume 31, and a first differential volume 32 which, when the stored content in the first primary volume is altered, stores information pertaining to the altered portion. The secondary volume group 40 is constructed including a second primary volume 41 associated with the first primary volume 31, and a second differential volume 42 associated with the first differential volume 32 and when the stored content in the second primary volume 41 is altered, stores information about the altered portion.

Furthermore, the storage system 100 is provided with: a volume snapshot unit 21 that controls synchronization or splitting of the primary volume group 30 and the secondary volume group 40; a differential snapshot unit 13 that generates differential snapshots of the first primary volume 31 and the second primary volume 41 respectively and stores these into the first differential volume 32 and the second differential volume 42 respectively; and a snapshot obtaining control unit 12 that controls both the volume snapshot unit 21 and the differential snapshot unit 13.

Then, the snapshot obtaining control unit 12 performs controls such that (1) when a snapshot obtaining request is received, (2) it is determined whether or not the usage rate of the first differential volume 32 has reached the pre-set given value, and (3) when it is determined that the usage rate has reached the given value, the volume snapshot unit 21 synchronizes and then splits the primary volume group 30 and the secondary volume group 40, (4) the differential snapshot unit 13 initializes the first differential volume 32, (5) the differential snapshot unit 13 stores a new differential snapshot into the first differential volume 32, and (6) backs up the stored content in the secondary volume group 40.

Figure 2:
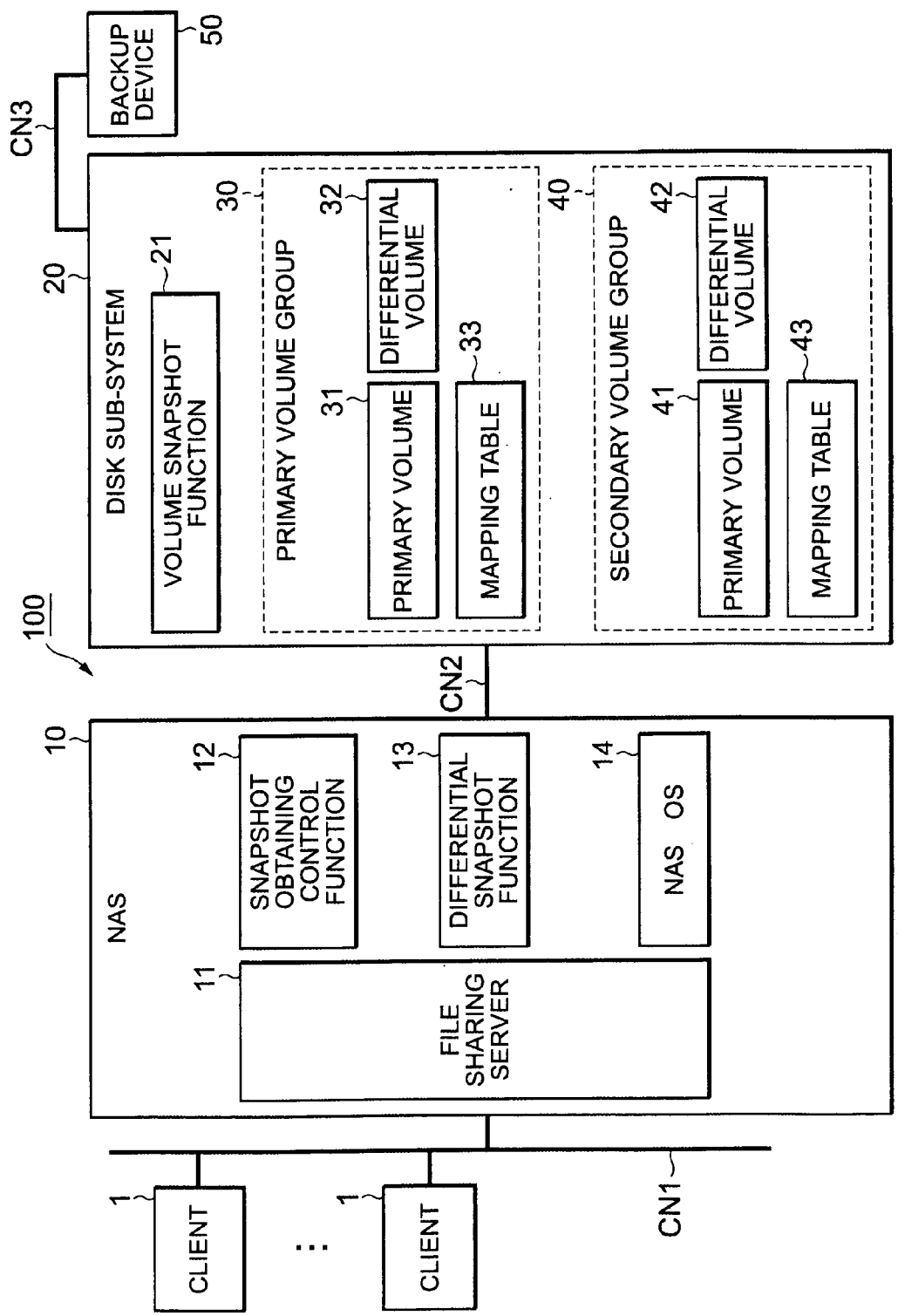
FIG. 2 is a block diagram showing an overall structure of the storage system.

First, referencing FIG. 1, explanation is given regarding an overall outline of the present invention. FIG. 2 and the subsequent diagrams are referenced while explaining specific constructions.

The storage system 100 is provided with a primary volume group 30 that is used as an access volume, and a secondary volume group 40 that is synchronized to the primary volume group 30. The primary volume group 30 is provided with the primary volume 31 and the differential volume 32. Similarly, the secondary volume group 40 is also provided with the primary volume 41 and the differential volume 42. Each differential volume 32, 42 can store for example three generations of differential snapshots D1 through D3 respectively. D1 indicates a first-generation differential snapshot, D2 indicates a second-generation differential snapshot, and D3 indicates a third-generation differential snapshot.

As shown in FIG. 1A, in the normal state the primary volume group 30 and the secondary volume group 40 are operated in the synchronized state. Alternatively, in the normal state, the primary volume group 30 and the secondary volume group 40 operate in the split state, and if the usage rate of the differential volume 31 has reached the given value when a new snapshot obtaining request is generated, the volume groups 30, 40 are synchronized. When operating in the synchronized state, the same data gets written into both the primary volume 31 on the primary volume group side, and the primary volume 41 on the secondary volume group side. Each time the snapshot obtaining request is issued from the client 1, the differential snapshot is created and stored in the differential volume 32. By synchronizing the volume groups 30, 40, the stored content in the differential volume 32 on the primary volume group side gets reflected in the differential volume 42 on the secondary volume group side. Thus, each differential volume 32, 42 has the differential snapshot with the same content.

As the storage system 100 continues to operate, eventually the usage rate of the differential volume 32 on the primary volume group side reaches the given value. The given value can be set to a value of about 70% to 90% of the initial capacity of differential volume 32 to prevent the new differential snapshot from being created exceeding the empty capacity of the differential volume 32. If the differential volume 32 is nearly full when the new snapshot obtaining request is generated, the access requests from the client 1 are cut off, and updating of the data is blocked from progressing any further. Then, as shown in FIG. 1B, the synchronization of the primary volume group 30 and the secondary volume group 40 is terminated (split).

Next, as shown in FIG. 1C, the differential volume 32 on the primary volume group side is initialized, and a newly requested fourth-generation differential snapshot D4 is created. On the other hand, the stored content in the secondary volume group 40 that was split is copied into the backup device 50 and backed up. Accordingly, the volume snapshot that was taken while split apart and each generation of snapshots D1 through D3 from before the split (before creating the new differential snapshot) are backed up. Note that when the usage rate of the differential volume 32 is at the given value (usage rate≧given value), the differential volume 32 will not be initialized until the new snapshot obtaining request is issued. Therefore, the generational data construction held in the differential volume 32 can be regenerated quickly in response to the request from the client 1.

As shown in FIG. 1D, after the backing up of the secondary volume group 40 finishes, the primary volume group 30 and the secondary volume group 40 join again, and re-synchronize. Thus, differential snapshots D4, D5 that were stored in the differential volume 32 on the primary volume group side while split apart, are also stored into the differential volume 42 on the secondary volume group side.

As described above, when the usage rate of the differential volume 32 on the primary volume group side reaches the given value, the primary volume group 30 and the secondary volume group 40 are split and the differential volume 32 on the primary volume side is initialized, and also the secondary volume group 40 is backed up. This enables the new differential snapshot to be created in the initialized differential volume 32, and, in the example shown in the diagram, enables the obtainable number of snapshots to double from 3 to 6.

Next, explanation is given regarding details of the storage system 100. FIG. 2 is an outline block diagram of the storage system 100. The storage system 100 can be constituted having a NAS (Network-Attached Storage) 10, a disk sub-system 20, and a backup device 50. The storage system 100 provides storage service to a plurality of clients 1.

The client 1 is a program running on a computer device, for example, such as a workstation, a server, a mainframe, a personal computer, etc. Each client 1 is connected to the NAS 10 via a communications network CN1, for example, which may be the Internet, a LAN (Local Area Network), or the like. Each client 1 can utilize file sharing functions provided by the NAS 10.

When the OS on the clients 1 is Windows (registered trademark of Microsoft Corporation, USA), file transferring between the clients 1 and the NAS 10 complies with CIFS (Common Internet File System) protocol. When the OS on the clients 1 is UNIX (registered trademark of X/Open Company Limited), the file forwarding between the clients 1 and the NAS 10 complies with NFS (Network File System) protocol.

The NAS 10 is a computer device that provides high-performance file sharing service. The NAS 10 is provided with a file sharing server 11, a snapshot obtaining control function 12, a differential snapshot function 13, and a NAS OS 14. Details of the main functions are explained below together with FIG. 3. Here, as described with FIG. 4, the NAS 10 can be provided inside the disk sub-system 20, or can be provided outside the disk sub-system 20. The NAS 10 and the disk sub-system 20 are connected by a communications network CN2, for example, such as a SAN (Storage Area Network).

The disk sub-system 20 provides large-capacity storage resources. The disk sub-system 20 can be provided with, for example, a volume snapshot function 21, a primary volume group 30, and a secondary volume group 40. The primary volume group 30 includes a primary volume 31, a differential volume 32, and a mapping table 33. The secondary volume group 40 includes a primary volume 41, a differential volume 42, and a mapping table 43.

The primary volume group 30 is a volume group used by each client 1. The secondary volume group 40 is a copy of the primary volume group 30. The primary volumes 31, 41 each store data groups used by the clients 1. The differential volumes 32, 42 each store the pre-update data which is evacuated from the primary volumes 31, 41 when updating the data in the primary volumes 31, 41. The mapping tables 33, 43 manage the original storage locations (pre-evacuation addresses) and the current storage locations (post-evacuation addresses), etc. of the data evacuated from the primary volumes 31, 41 to the differential volumes 32, 42.

A backup device 50 is connected to a disk sub-system 20 via a SAN, a LAN, or other such communications network CN3. The backup device 50 may be constituted of a storage device such as a magnetic tape, a hard disk, a semiconductor memory, or the like, and stores data sent from the disk sub-system 20.

Figure 3:
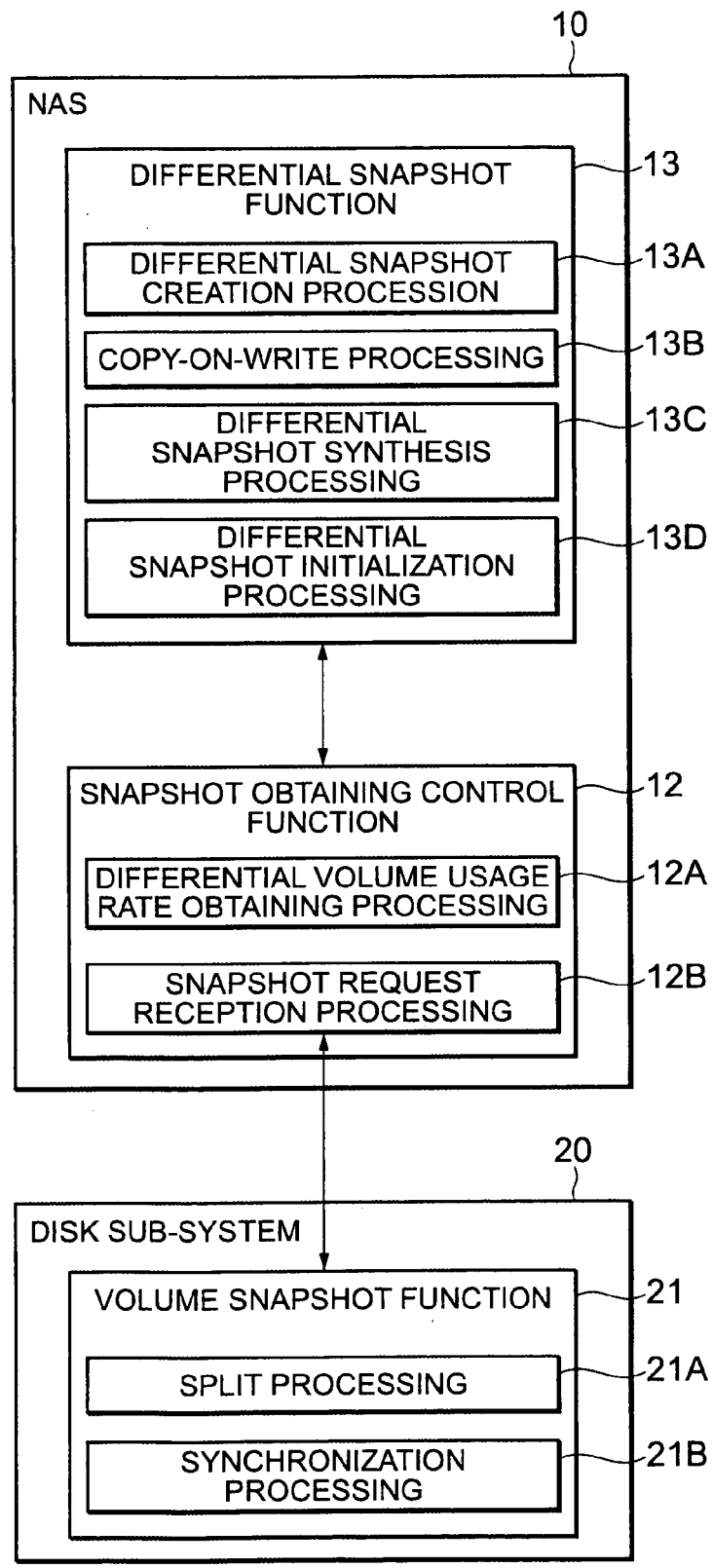
FIG. 3 is an explanatory diagram showing relationships between a differential snapshot function, a volume snapshot function, and a snapshot obtaining control function.

Next, FIG. 3 is a block diagram in which chief functions of the storage system 100 are extracted and showed. As described above, the NAS 10 is provided with a snapshot obtaining control function 12 and a differential snapshot function 13. Specific control programs are executed on a computational device (CPU, etc.) of the NAS 10 to realize each of these functions 12, 13.

The differential snapshot function 13 is explained first. The differential snapshot function 13 creates the snapshot looking at the altered locations on the primary volumes 31, 41. The differential snapshot function 13 can include differential snapshot creation processing 13A, copy-on-write processing 13B, differential snapshot synthesis processing 13C, and differential snapshot initialization processing 13D.

The differential snapshot creation processing 13A secures an area for creating the snapshot and an area for creating the mapping table 33 in the differential volumes 32, 42. When an update request from the client 1 is generated, the copy-on-write processing 13B is processing which reads out the update target data from the primary volumes 31, 41, evacuates this data to the differential volumes 32, 42, and updates the mapping tables 33, 43. The differential snapshot synthesis processing 13C regenerates the designated generation of data, based on the request from the client 1, and based on the primary volumes 31, 41, the differential volumes 32, 42, and the mapping tables 33, 43. The differential snapshot initialization processing 13D deletes the differential snapshots from the differential volumes 32, 42, and initializes the mapping tables 33, 43.

The volume snapshot function 21 provided to the disk sub-system 20 can include split processing 21A and synchronization processing 21B. The split processing 21A terminates the synchronization of the primary volume group 30 and the secondary volume group 40, and stops the reflection of the data from the primary volume group 30 to the secondary volume group 40. The synchronization processing 21B synchronizes the stored content in the primary volume group 30 and the secondary volume group 40. The synchronization is performed on the entire volume group, and does not synchronize the individual volumes individually. However, even in a case where the individual volumes included in the volume group are synchronized individually, such a configuration would be included within the scope of the present invention.

The snapshot obtaining control function 12 of the NAS 10 controls the operations of the differential snapshot function 13 and the volume snapshot function 21 when the snapshot obtaining request is received. The snapshot obtaining control function 12 can include, for example, differential volume usage rate obtaining processing 12A and snapshot request reception processing 12B. The differential volume usage rate obtaining processing 12A obtains the usage rate of the differential volume 32. A usage rate p of the differential volume 32 can be obtained, for example, by dividing the product of the number of updated blocks C and the block size Sb (C×Sb) by the entire capacity Sdv0 of the differential volume 32 (p=C×Sb/Sdv0). For example, commands in the NAS OS 14 can be executed, or a program for calculating the usage rate can be provided, to derive the usage rate of the differential volume 32.

The snapshot request reception processing 12B boots when the client 1 requests the snapshot be obtained. The usage rate of the differential volume 32 is used to control the operations of the differential snapshot function 13 and the volume snapshot function 21. Details are further described below with FIG. 8, but when the usage rate of the differential volume 32 reaches the pre-set given value, the snapshot request reception processing 12B splits the primary volume group 30 and the secondary volume group 40 (or, when performing split operations, the processing synchronizes the volume groups first and then splits them again), and initializes the differential volume 32 in the primary volume group, and also backs up the secondary volume group 40 into the backup device 50.

Note that the snapshot obtaining control function 12 and the differential snapshot function 13 do not have to be mounted in the NAS 10, but can also be mounted in the disk sub-system 20.

Figure 4:
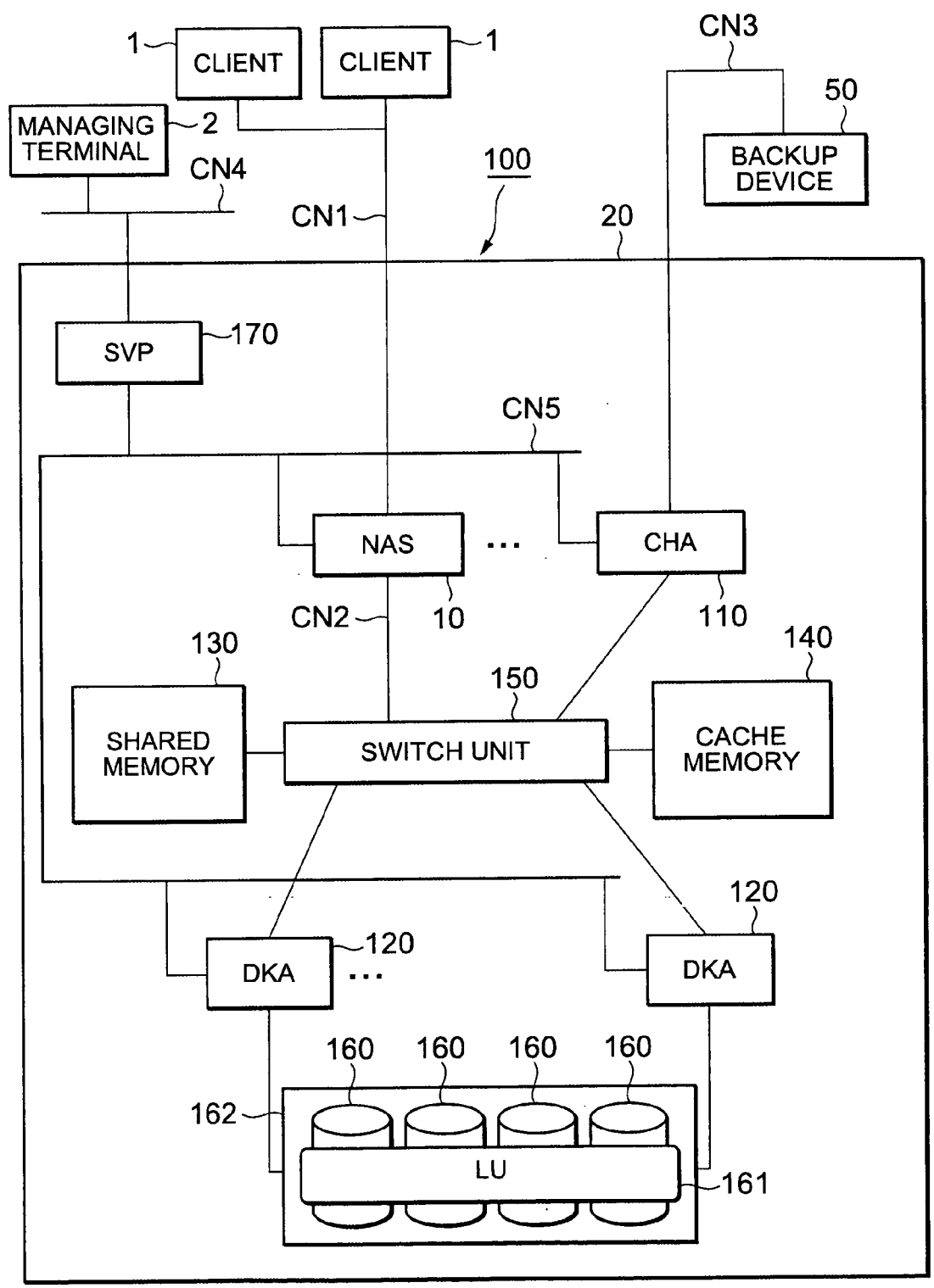
FIG. 4 is a block diagram focusing on a hardware construction of the storage system.

Next, FIG. 4 is a summary block diagram focusing on a hardware construction of the storage system 100. In the example shown in FIG. 4, the NAS 10 maybe constructed as one or a plurality of control packages, and may be mounted to the disk sub-system 20, whereby constituting the storage system 100.

The disk sub-system 20 can be provided with a plurality of channel adapters (only one is depicted in the diagram, hereinafter referred to as a CHA) 110, a plurality of disk adapters (hereinafter, DKAs) 120, a shared memory 130, a cache memory 140, a switch unit 150, a plurality of disk drives 160, and a service processor (hereinafter, SVP) 170. A managing terminal 2 is connected to the disk sub-system 20 via a LAN or other communications network CN4. A managing terminal 2 monitors and performs settings and the like of the disk sub-system 20 via the SVP 170.

Each CHA 110 may be provided according to the type of host device to which it is connected, including open CHAs, mainframe CHAs, and the like. Each CHA 110 sends and receives data to/from the host device. Inside each CHA 110 there is provided a processor, a local memory, a data processing circuit, etc. (none of which are displayed in the diagram). The present embodiment shows a case where each client 1 uses the file sharing service via the NAS 10. Then, as shown in the example in FIG. 4, the CHA 110 can be used to forward data to the backup device 50. However, the present invention is not limited to this configuration. A host device outside the diagram can use a disk sharing service via the CHA 110. That is, the storage system 100 is a system which can provide both file sharing service and disk sharing service, each independently.

Each DKA 120 controls the sending and receiving of data to/from the disk drive 160. Each DKA 120 has a built-in processor, local memory, data processing circuit, and the like (none are shown in the diagram).

The shared memory 130 may store a control command, management information, and the like, and is constructed from a nonvolatile memory or the like. The cache memory 140 may store user data and the like, and is constructed from a nonvolatile memory or the like. The shared memory 130 and the cache memory 140 are each constructed as separate memory packages, or may be constructed with the shared memory 130 and the cache memory 140 together on the same substrate. Alternatively, a portion of the memory may be used as a shared memory area, with another portion used as a cache area.

Each disk drive 160 can be constructed from a storage device such as a hard disk drive (HDD), a semiconductor memory device, an optical device, etc. The storage device 162 is constructed from the plurality of physical disk drives 160. A RAID group can be constructed with a given number of disk drives 160. The "RAID group" is a disk group for achieving data redundancy according to RAID 5, for example. On each physical storage area provided by the disk drives 160, there may be at least one or more logical volumes (logical units) 161, which are logical storage areas.

The logical volume 161 constitutes each volume in the primary volume group 30 and in the secondary volume group 40.

The switch unit 150 may be constructed as an ultra-high speed cross-bus switch or the like, connecting a NAS 20, the CHAs 110, the DKAs 120, the shared memory 13, and the cache memory 140 to each other.

The SVP 170 is connected to the NAS 20, the CHAs 110, the DKAs 120 and the shared memory 130 via an internal network CN5 in the LAN or the like. The SVP 17 accumulates various types of information such as input/output speed (IOPS), device construction, temperature and power source alarms, and the like, and provides these to the managing terminal 2.

Figure 5:
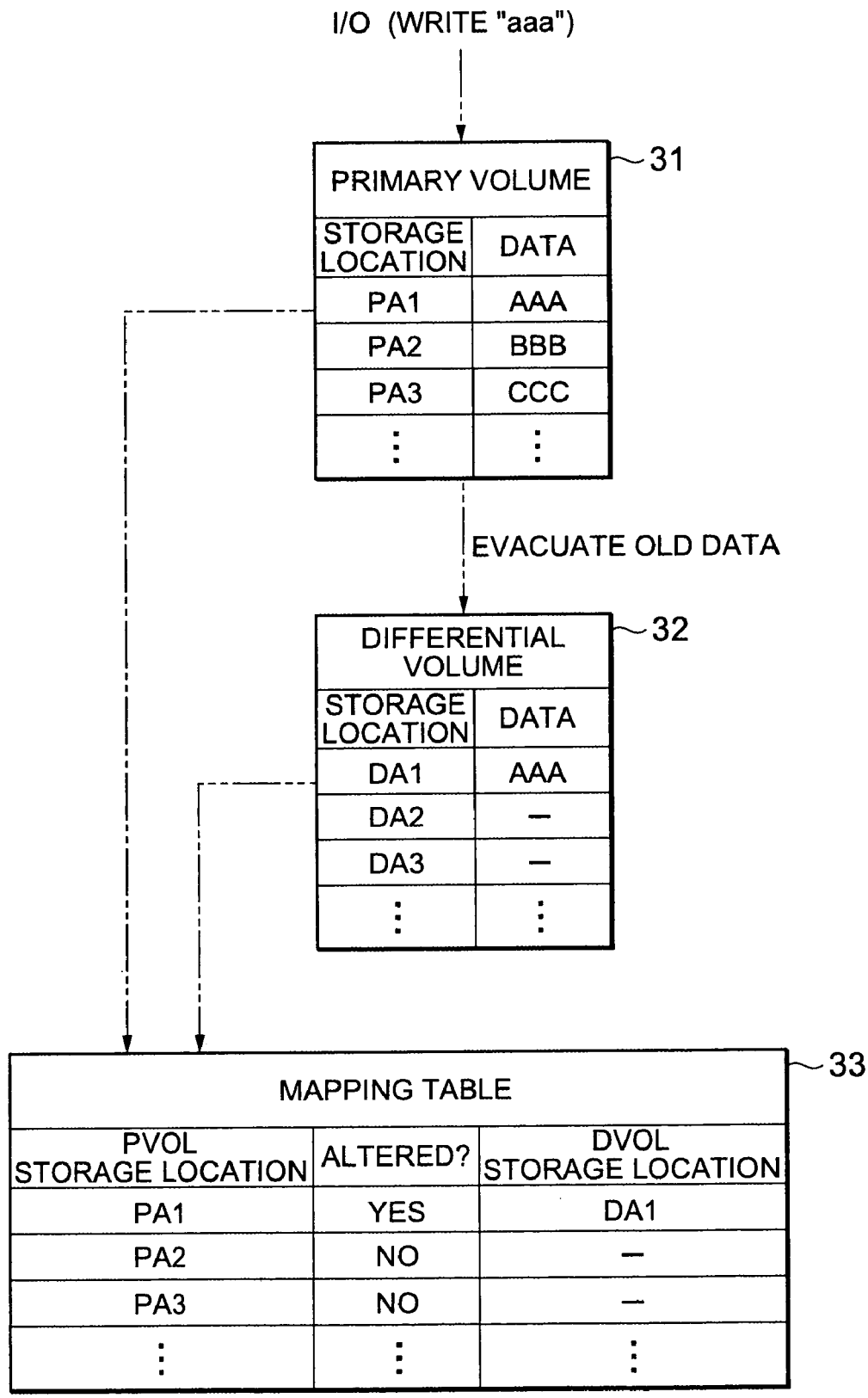
FIG. 5 is an explanatory diagram showing relationships between a primary volume, a differential volume, and a mapping table.

Next, FIG. 5 is an explanatory diagram showing, in abbreviated form, relationships between each volume 31, 32 and the mapping table 33. In the primary volume 31, for example data "AAA" is stored in a storage location PA1, data "BBB" is stored in a storage location PA2, and data "CCC" is stored in a storage location PA3. Data is stored in other locations as well, but explanations thereof are omitted for ease of explanation.

When the client 1 writes data "aaa" into the storage location of the data "AAA" (i.e., when an update request to update the data stored in the storage location PA1 is generated) the target data "AAA" is evacuated to the differential volume 32. This post-evacuation address is shown as DA1. Then, information about the evacuation of the data is stored in the mapping table 33. That is, for each storage location PA in the primary volume (PVOL) 31, the mapping table 33 shows correspondences between flag information determining whether or not an alteration occurred in the stored content, and the post-evacuation storage location DA when an update has occurred. When the data in the primary volume 31 is rewritten due to the update request from the client 1, the pre-update data is evacuated to the differential volume 32, and the pre-evacuation address PA, the post-evacuation address DA, and information indicating that an alteration occurred, are stored in the mapping table 33.

Figure 6:
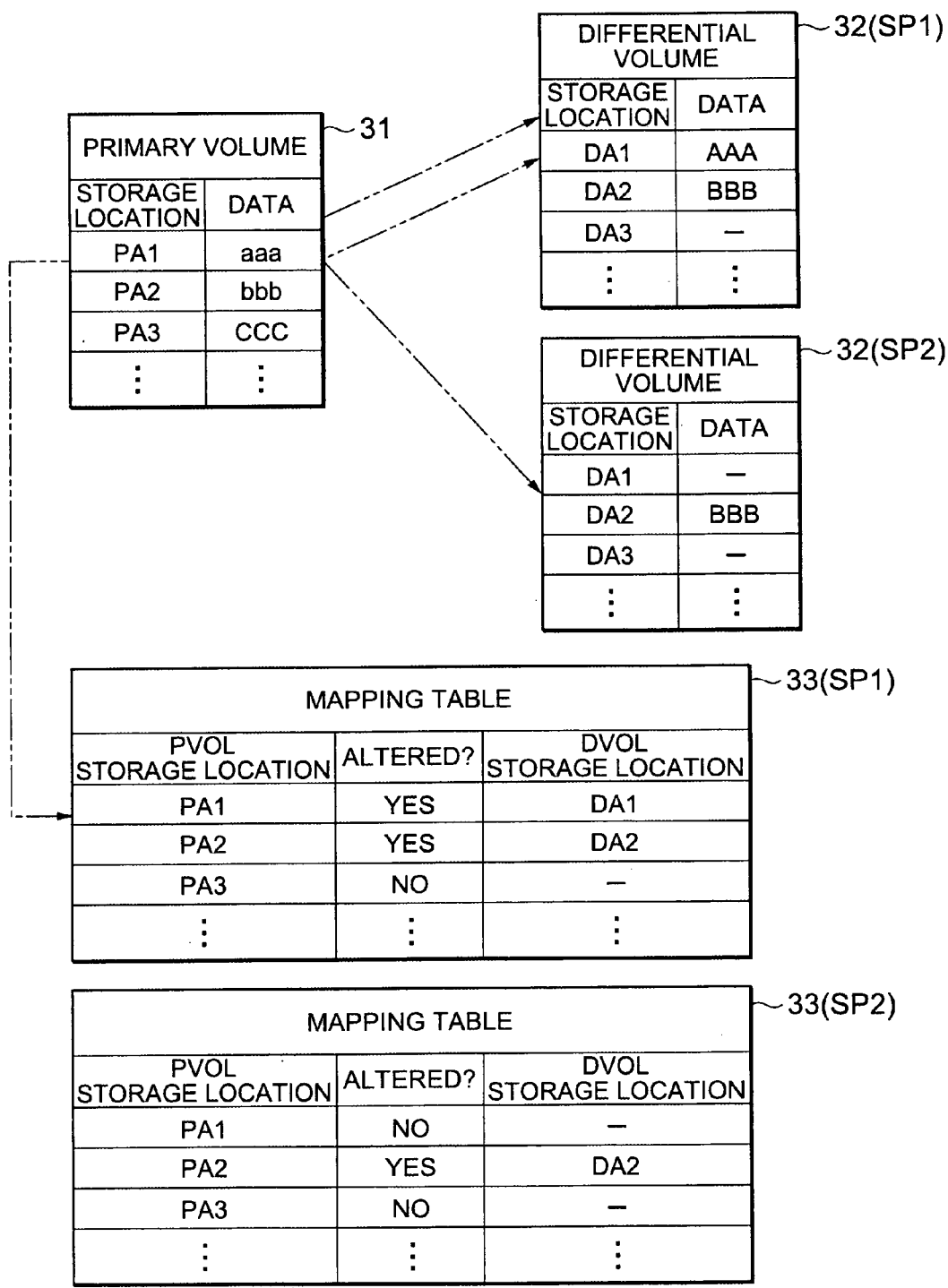
FIG. 6 is an explanatory diagram schematically showing creation of a differential snapshot.

FIG. 6 is an explanatory diagram showing, in abbreviated form, relationships between each volume 31, 32 and the mapping table 33 at the time when the differential snapshot is obtained. It is assumed here that after a first snapshot (SP1) obtaining request has been received the stored content "AAA" at the storage location PA1 in the primary volume 31 is updated to the data "aaa". At this time, the differential snapshot (SP1) in the differential volume 32 is storing the pre-update stored content "AAA" from the storage location PA1.

Furthermore, when a second snapshot obtaining request (SP2) is received and the stored content at the storage location PA2 in the primary volume 31 is updated from "BBB" to "bbb", the data "BBB" is also stored in the first differential snapshot (SP1) in addition to the data "AAA". Furthermore, only the data "BBB" from the current update is stored in the second differential snapshot (SP2).

In the mapping table 33 (SP1) that manages the first differential snapshot (SP1), there is stored information relevant to the first update (PA1, DA1 and the flag indicating the alteration occurred), and the information relevant to the next update (PA2, DA2 and the flag indicating the alteration occurred). On the other hand, in the mapping table 33 (SP2) that manages the second differential snapshot (SP2), there is stored only the information relevant to the most recent update (PA2, DA2 and the flag indicating the alteration occurred).

That is, in order to leave the data image of the primary volume 31 at the times when each snapshot obtaining request was received, it is necessary to control the stored content in the differential volume 32 and the mapping table 33, which are relevant to each differential snapshot. For example, in order to maintain the still image data from the time when the first differential snapshot SP1 was created, it is necessary to store and manage all data updates that are performed thereafter.

In this way, the data is evacuated to the differential volume 32, and the information about the evacuated data is managed in the mapping table 33, whereby the data construction at the time when the snapshot was created can be regenerated. For example, even after updating the stored content in the storage locations PA1 and PA2 in the primary volume 31, the differential volume 32 (SP1) and the mapping table 33 (SP1) can be referenced to learn that at the time when the first differential snapshot (SP1) was created, the data "AAA" was being stored in the storage location PA1, and the data "BBB" was being stored in the storage location PA2. Therefore, based on the mapping table 33 (SP1), the differential volume 32 (SP1) can be read to easily regenerate the data construction at that point in time.

Figure 7:
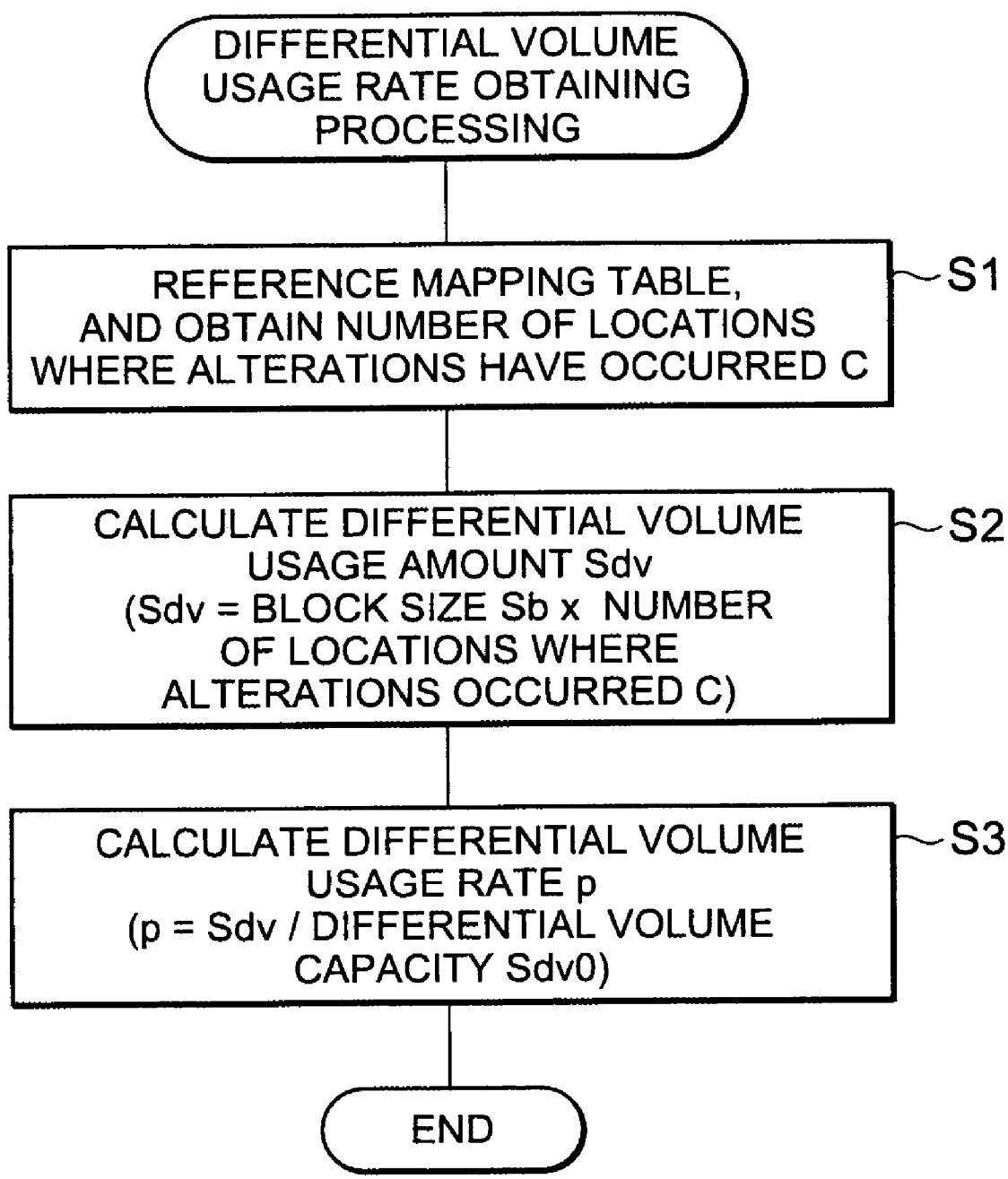
FIG. 7 is a flowchart showing processing to obtain a differential volume usage rate.

FIG. 7 is a flowchart showing an outline of the differential volume usage rate obtaining processing 12A. The differential volume usage rate obtaining processing 12A is booted by the snapshot request reception processing 12B.

First, the NAS 10 references the mapping table 33 and obtains the number of blocks C of altered locations in the primary volume 31 (S1). Next, the NAS 10 calculates the usage amount Sdv of the differential volume 32 (S2). The differential volume usage amount Sdv can be obtained from the product of the block size Sb and the number of altered blocks C (Sdv=Sb×C). Here, the block size Sb is calculated as a fixed length. However, when the block size is variable, the block sizes at each of the altered locations may be totaled up.

Then, the NAS 10 calculates the usage rate p of the differential volume 32 (S3). The usage rate p is obtained by dividing the differential volume usage amount Sdv by the total capacity Sdv0 of the differential volume 32 (p=Sdv/Sdv0).

Figure 8:
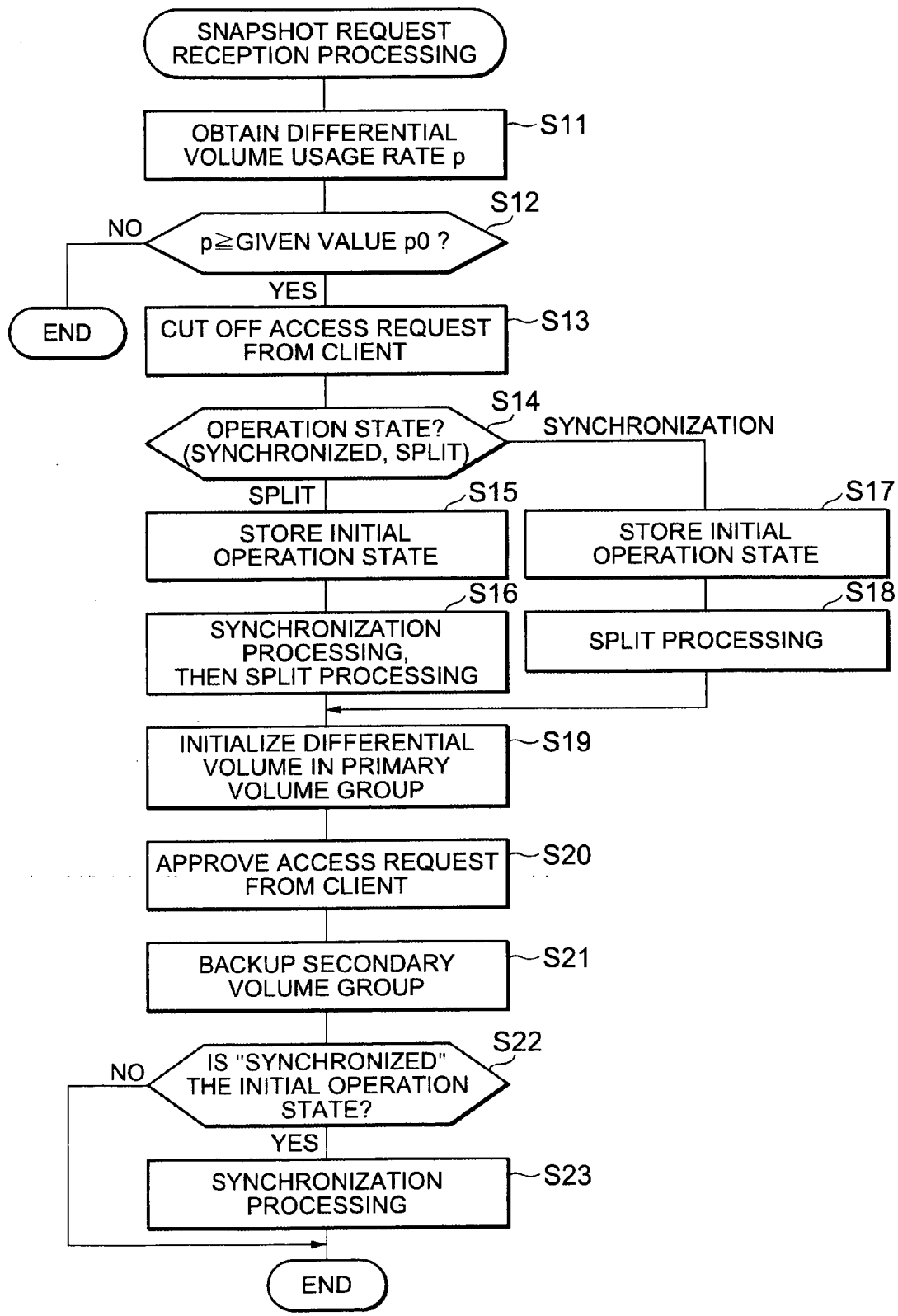
FIG. 8 is a flowchart showing snapshot request reception processing.

Next, FIG. 8 is a flowchart showing a processing outline of the snapshot request reception processing 12B. This processing is executed when the request to obtain the snapshot is inputted from the client 1.

The NAS 10 calls up the differential volume usage rate obtaining processing 12A, and obtains the usage rate p (S11). Next, the NAS 10 compares the usage rate p and the pre-set given value p0, and determines whether or not the usage rate p has reached the pre-set given value p0 (S12). When the usage rate p at the time when the snapshot obtaining request was received has not reached the pre-set given value p0 (S12: NO), the current processing ends. Accordingly, the differential snapshot function 13 secures the storage area to create the new differential snapshot and the storage area to create the new mapping table 33, and obtains the image of the data at the designated time.

On the other hand, when the usage rate p at the time when the snapshot obtaining request was received is equal to or greater than the given value p0 (S12: YES), the NAS 10 cuts off the access requests from the clients 1, and blocks the updating of the primary volumes 31, 41 from progressing any further (S13).

Then, the NAS 10 determines the current operating state of the primary volume group 30 and the secondary volume group 40 (S14). The operating states include the synchronized state and the split state. When the primary volume group 30 and the secondary volume group 40 are operating in the synchronized state, the same data is inputted into the primary volume group and the secondary volume group respectively, so the stored content in both volume groups 30, 40 match each other. On the other hand, when the primary volume group 30 and the secondary volume group 40 are operating in the split state, the data is inputted into only the primary volume group 30, and so the stored content in both volume groups 30, 40 do not match each other.

When the snapshot obtaining request is received while the primary volume group 30 and the secondary volume group 40 were operating in the split state, the NAS 10 stores the initial operating state (i.e., the split state) (S15). Next, the NAS 10 synchronizes the primary volume group 30 and the secondary volume group 40, and then splits both volume groups 30, 40 again (S16). That is, in the case where the volume groups were operating in the split state, the NAS 10 makes the stored content in the volume groups 30, 40 mutually the same before splitting them.

By contrast, when the snapshot obtaining request is received while the primary volume group 30 and the secondary volume group 40 were operating in the synchronized state, the NAS 10 stores this initial operation state (i.e., the synchronized state) (S17), and then splits both volume groups 30, 40 (S18). The synchronization or the splitting of the volume groups 30, 40 is performed by the volume snapshot function 21.

In this way, when the snapshot obtaining request was received after the usage rate of the differential volume 32 reaches the given value, the stored content in the primary volume group 30 and the secondary volume group 40 are made to match each other before the volume groups 30, 40 are split. This enables the volume snapshot to be obtained.

Then, the NAS 10 uses the differential snapshot function 13 to initialize the differential volume 32 on the primary volume group side (S19). Accordingly, the differential snapshot of each previous generation stored in the differential volume 32 is lost. However, each of these previous generations of differential snapshots is copied into the differential volume 42 on the secondary volume group side by the volume snapshot.

When the volume groups 30, 40 are in the split state, the new generation differential snapshot created by the differential snapshot function 13 is saved in the initialized differential volume 32. Therefore, as shown in FIG. 1C, the differential snapshot held on the primary volume group side, and the differential snapshot held on the secondary volume group side, do not match each other. This state of mismatch between the volume groups 30, 40 beings when the differential volume 32 is initialized, and ends when the volume groups 30, 40 are re-synchronized. Note that when the differential volume 32 was initialized, the usage amount Sdv of the differential volume 32 became 0, and the usage rate p at that point in time also became 0.

Next, the NAS 10 approves an access request from the client 1 (S20). This enables each client 1 to access the primary volume group 30 to reference data and update data.

On the other hand, the NAS 10 uses the secondary volume group 40 that is split to perform backup processing (S21). Accordingly, the stored content in the secondary volume group 40 is stored into the backup device 50.

In this way, the NAS 10 creates the volume snapshot and then uses the primary volume group 30 to provide the file sharing service to the clients 1, and also uses the secondary volume group 40 to perform the backup processing. Accordingly, the differential snapshots of each previous generation up to when the snapshot obtaining request was received, are held in the backup device 50. This backup processing is not interrupted by the file sharing service provided by the NAS 10.

Then, the NAS 10 determines whether or not the initial operation state was the synchronized state (S22). When operations were in the synchronized state (S22: YES), the volume snapshot function 21 re-synchronizes the primary volume group 30 and the secondary volume group 40 (S23). When the initial operation state was the split state (S22: NO), the volume groups 30, 40 were already split, and so the NAS 10 ends the processing. That is, at S22, S23, the operating state is returned to the state before the differential snapshot was initialized.

Note that, in a case where the data constructions of the previous generations backed up on the backup device 50 are necessary, the backup data of the secondary volume group 40 is restored from the backup device 50 into the disk sub-system 20. Then, the restored primary volume 41, differential volume 42 and mapping table 43 can be referenced to obtain the data construction of the designated generation.

The present embodiment which is described above is constructed such that the primary volume group 30 including the primary volume 31 and the differential volume 32, and the secondary volume group 40 including the primary volume 41 and the differential volume 42, can be synchronized. Therefore, the user can use both the volume snapshot and the differential snapshot. This achieves both reduced capacity and high reliability in the snapshot, thus improving convenience to the user.

In particular, the present embodiment was constructed to operate the volume snapshot and the differential snapshot in synchronization. That is, each time the usage of the differential volume 32 advances, the entire primary volume group 30 including the differential volume 32 is copied by the volume snapshot. Therefore, as compared with a case where only the volume snapshot is used, it becomes possible to reduce the volume needed for the snapshot. Further, as compared with a case where only the differential snapshot is used, the reliability of the snapshot can be increased.

Furthermore, the present embodiment is constructed such that when the usage of the differential volume 32 advances, the volume snapshot of the primary volume group 30 is taken, and the differential volume 32 is initialized. Therefore, the new differential snapshot can be created and saved into the initialized differential volume 32. Accordingly, the obtainable number of differential snapshots nearly doubles, improving the convenience of the data management.

Furthermore, the differential volume 32 is initialized based on whether or not the usage rate of the differential volume has reached the given value. Therefore, the differential volume 32 can be used more effectively than when the differential volume 32 is initialized based on the number of times that the snapshot has been obtained.

Figure 9:
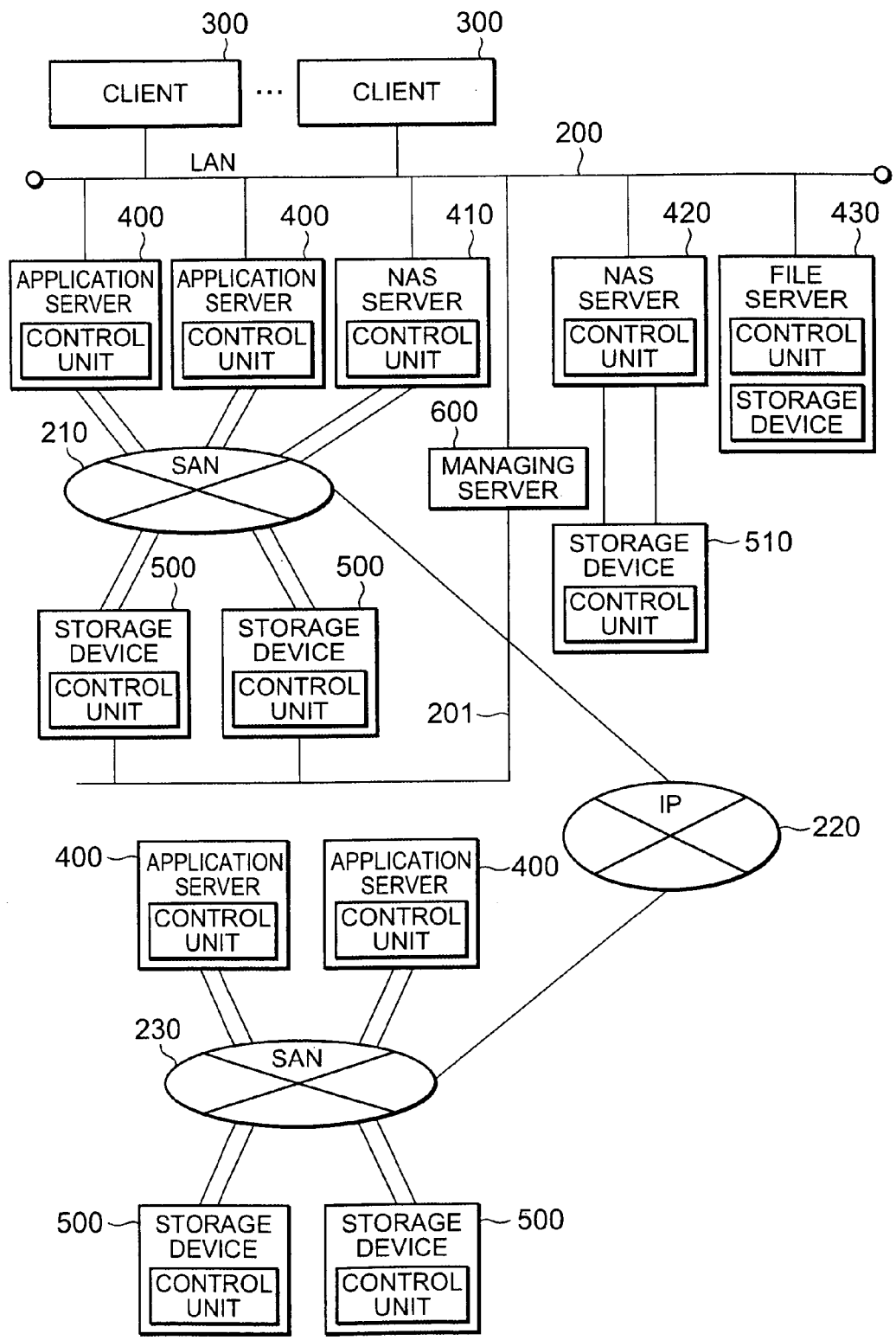
FIG. 9 is an outline diagram of a storage system including various types of connections between servers and storage devices.

Next, based on FIG. 9, explanation is given regarding a variant example of the present invention. FIG. 9 shows a storage system including various types of connections between storage devices and servers. In this storage system, roughly three types of connections are disclosed.

A first connection type is a type that connects the server and the storage device via a network such as a SAN. A second connection type is a type that directly connects the server and the storage device. A third connection type is a type where the storage device is provided inside the server.

The overall construction in FIG. 9 can be explained simply as follows. Connected to a LAN 200 are a plurality of clients 300, a plurality of application servers 400, NAS servers 410, 420, a file server 430, and a managing server 600.

The application servers 400, the NAS server 410, and the storage devices 500 are connected to each other via the SAN 210. The SAN 210 is connected to another SAN 230 via an IP network 220, for example. Similarly to the SAN 210, connected to the other SAN 230 are the plurality of application servers 400 and the plurality of storage devices 500. Therefore, the servers and storage devices connected to the SAN 210, and the servers and storage devices connected to the SAN 230, can perform data communications with each other.

Here, the application server 400 provides various work application services to the clients 300. The NAS server 410 is a dedicated server specialized for the file sharing service. The storage devices 500 are devices serving as the disk sub-system 20 which, as described above, provides large-capacity storage area to the application servers 400, the NAS server 410, and the like. The managing server 600 is connected to each of the devices 500 via the LAN 201, and can manage the construction, states, etc. of each storage device 500. Furthermore, the managing server 600 is connected to each of the application servers 400, the NAS server 410, and the like via the LAN 200. The managing server 600 can output various commands to the storage devices 500 instead of the work serves 400, the NAS server 410 and the like.

In the construction shown in FIG. 9, the NAS servers 400 and the storage devices 500, which are connected to each other by means of the SAN 210, are one example of the first connection type.

The other NAS server 420 is connected directly to another storage device 510. This connection type falls under the above-mentioned second connection type, for example. The above-mentioned embodiment is explained using the second connection type as an example. The NAS server 420 and the storage device 510 can send and receive data based on a protocol such as TCP/IP, for example.

The file server 430 is a server that has a file sharing protocol and the like on a general-purpose OS, and provides the file sharing service. The file server 430 can be provided with the storage device inside it. The file server 430 falls under the third connection type.

In addition to the construction (second connection type) with the NAS 420 and the storage device 510, the present invention can also be applied in a construction that connects the NAS 410 and the storage devices 500 with the SAN 210 (first connection type), or a construction such as with the file server 430.

Specifically, the NAS 10 shown in FIG. 2 may be any of the servers 400 through 430 shown in FIG. 9. Furthermore, the disk sub-system 20 shown in FIG. 2 may be either of the storage devices 500, 510 shown in FIG. 9.

Note that the present invention is not restricted to the above-mentioned embodiments. A person skilled in the art can make various additions, modifications and the like within the scope of the present invention.

For example, even when the usage rate of the differential volume has not reached the given value, a designation by the user can serve to synchronize the primary volume group and the secondary volume group and initialize the differential volume.

Furthermore, the usage state of the differential volume can be monitored at all times, and when a given state (such as when the usage rate reaches the given value), the primary volume group and the secondary volume group can be synchronized regardless of whether or not there was the snapshot obtaining request.

Furthermore, instead of the usage rate of the differential volume, the number of times that the differential snapshot was obtained may also be used.

Furthermore, a construction is also possible in which a copy of the secondary volume group is placed at a remote site.

What is claimed is:

1. A storage system, comprising:
    a first volume for storing data updated or referenced by a host device;
    a first alteration status management volume for storing information indicating an alteration status of the first volume;
    a second volume associated with the first volume;
    a second alteration status management volume associated with the first alteration status management volume; and
    a volume synchronization unit that makes a shift to a split processing from a synchronization processing when a usage rate of the first alteration status management volume has reached a pre-given value,
    wherein the split processing splits the first volume and the second volume, and the synchronization processing synchronizes stored content in the first volume and the second volume, and synchronizes stored content in the first alteration status management volume and the second alteration status management volume, respectively.

2. The storage system according to claim 1, further comprising a control unit that, when a usage state of the first alteration status management volume reaches a pre-set state, makes the volume synchronization unit perform the synchronization processing, and initialize the first alteration status management volume.

3. The storage system according to claim 1, further comprising a control unit that, under normal circumstances makes the volume synchronization unit perform the synchronization processing, and when a usage state of the first alteration status management volume reaches a pre-set state, makes the volume synchronization unit stop the synchronization processing and initialize the first alteration status management volume.

4. The storage system according to any of claim 2 and claim 3, wherein the control unit makes a backup storage unit backup the second volume and the second alteration status management volume when the synchronization processing is complete.

5. The storage system according to claim 1, wherein the volume synchronization unit executes the synchronization processing by inputting update data from the host device into the first volume and the second volume, respectively.

6. The storage system according to claim 1, wherein the first alteration status management volume stores information relevant to an altered portion in the first volume, and the second alteration status management volume stores information relevant to an altered portion in the second volume.

7. The storage system according to any of claim 2 and claim 3, wherein the usage state of the first alteration status management volume is a usage rate of the first alteration status management volume, and the pre-set state is a pre-set given value.

8. A storage system control method for a storage system comprising a first volume group including a first volume and a first differential volume for storing information indicating an altered portion in the first volume, and a second volume group including a second volume associated with the first volume, and a second differential volume associated with the first differential volume, the control method comprising the steps of:
    synchronizing the first volume group with the second volume group and using stored content in the first volume group and stored content in the second volume group;
    obtaining a usage rate of the first differential volume;
    stopping synchronization of the first volume group and the second volume group when the usage rate has reached a pre-set given value; and
    initializing the first differential volume.

9. The storage system control method according to claim 8, further comprising a step of backing up the stored content in the second volume group, after the step of stopping the synchronization of the first volume group and the second volume group.

10. A storage system, comprising: a primary volume group and a secondary volume group,
    wherein the primary volume group includes a first primary volume, and a first differential volume that, when stored content in the first primary volume has been altered, stores information about the altered portion,
    wherein the secondary volume group includes a second primary volume associated with the first primary volume, and a second differential volume that is associated with the first differential volume and, when stored content in the second primary volume has been altered, the second differential volume stores information about the altered portion,
    wherein the storage system further comprises:
        a volume snapshot unit for performing control to synchronize or split the primary volume group and the secondary volume group;
        a differential snapshot unit for generating differential snapshots of the first primary volume and the second primary volume respectively, and storing the snapshots in the first differential volume and the second differential volume, respectively; and
        a snapshot obtaining control unit for controlling the volume snapshot unit and the differential snapshot unit, respectively, and
    wherein the snapshot obtaining control unit performs the following:
        (1) when receiving a snapshot obtaining request,
        (2) determines whether or not a usage rate of the first differential volume has reached a pre-set given value,
        (3) in a case where it is determined that the usage rate has reached the given value, causes the volume snapshot unit to synchronize and then split the primary volume group and the secondary volume group,
        (4) causes the differential snapshot unit to initialize the first differential volume,
        (5) causes the differential snapshot unit to store a new differential snapshot in the first differential volume, and
        (6) backs up stored content in the secondary volume group.

* * * * *